United States Patent

Schneider

[15] 3,655,991

[45] Apr. 11, 1972

[54] POWER OUTPUT UNIT AND METHOD FOR DELIVERING CONSTANT FREQUENCY, CONSTANT VOLTAGE AC POWER

[72] Inventor: Franklin R. Schneider, Seattle, Wash.

[73] Assignee: Modern Industries, Incorporated, Seattle, Wash.

[22] Filed: Feb. 8, 1971

[21] Appl. No.: 113,332

[52] U.S. Cl. .............................................. 307/10 R, 290/50
[51] Int. Cl. ..................................................... H02j 3/00
[58] Field of Search ................ 307/10 R; 290/1, 51, 50, 38 R

[56] References Cited

UNITED STATES PATENTS

| 3,127,518 | 3/1964 | Pruitt | 307/10 R X |
| 3,293,443 | 12/1966 | Burch | 307/10 R X |
| 3,456,119 | 7/1969 | Schneider | 307/10 R X |
| 3,471,706 | 10/1969 | Schneider | 307/10 R |
| 3,497,709 | 2/1970 | Chilton et al. | 307/10 R |

Primary Examiner—Robert K. Schaefer
Assistant Examiner—William J. Smith
Attorney—Graybeal, Cole & Barnard

[57] ABSTRACT

An accessory unit for use with an engine powered vehicle having a conventional electrical system including a battery, voltage regulator and a dynamo which in normal operation supplies DC power to the vehicle electrical system, including switches adapted to isolate the dynamo from the vehicle electrical system, and means for boosting the DC voltage dynamo output and converting it to a constant frequency AC voltage. An outlet receptacle is provided to accept jacks from power tools, appliances or the like having constant frequency AC voltage power requirements. The outlet receptacle voltage is monitored and the dynamo field current is adjusted in response to variations therein to control the dynamo voltage and amperage input to the unit.

In another embodiment of the invention, a secondary coil is provided on the transformer along with conventional rectifying means to step down and rectify the increased AC output voltage. Voltage regulator means is provided to sense variations in this low voltage DC secondary output and control the dynamo field current in response to variations therein to maintain a desired dynamo output voltage and amperage. Additionally, the vehicle battery may be charged by an output from the rectified low voltage secondary output of the transformer.

22 Claims, 6 Drawing Figures

Patented April 11, 1972

INVENTOR
FRANKLIN R. SCHNEIDER
BY Graybeal, Cole & Barnard
ATTORNEYS

Patented April 11, 1972
3,655,991
2 Sheets-Sheet 2
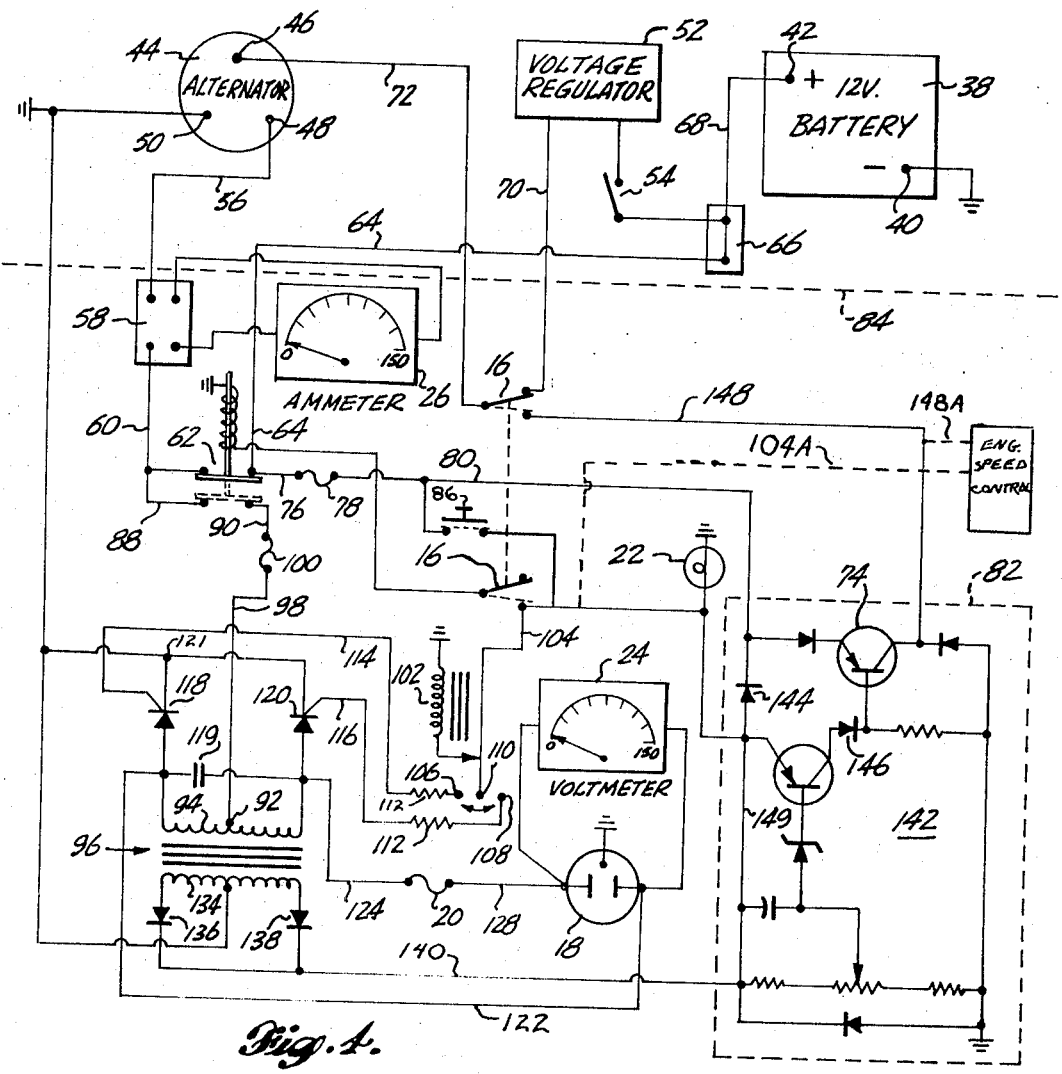
Fig. 4.
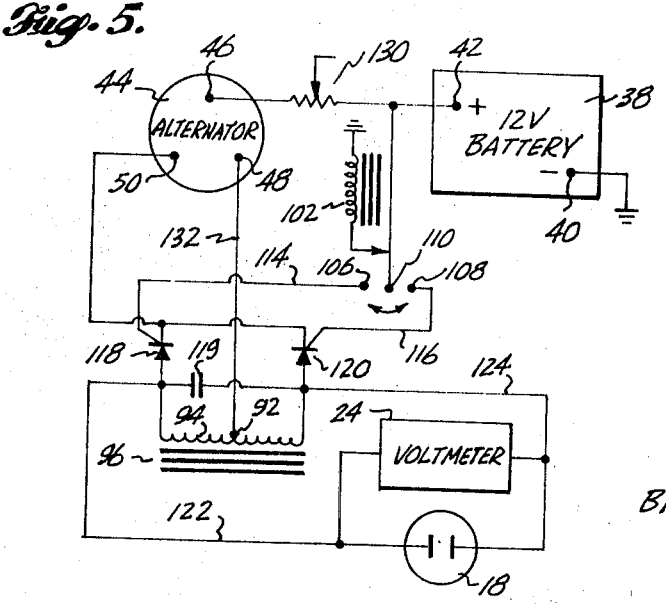
Fig. 5.
Fig. 6.
INVENTOR
FRANKLIN R. SCHNEIDER
BY Troybeal, Cole & Barnard
ATTORNEYS 3,655,991

POWER OUTPUT UNIT AND METHOD FOR DELIVERING CONSTANT FREQUENCY, CONSTANT VOLTAGE AC POWER

BACKGROUND OF THE INVENTION

1. Field of the Invention

This invention relates to power units for use in conjunction with conventional electrical systems of engines, including the electrical systems of engine powered vehicles, to provide a constant frequency AC output for operating power tools, appliances or the like. More particularly, this invention relates to a power output accessory unit for use with an engine powered vehicle or the like, to utilize the DC output of the engine driven dynamo of the vehicle to produce a higher voltage AC power output such as the common 120 volts at 60 hertz.

2. Description of the Prior Art

As may be well known, the conventional electrical systems of engine powered land and marine craft usually include a DC battery, a dynamo adapted to deliver low voltage DC power to the vehicle electrical system and a voltage regulator connected therebetween and adapted to control the output voltage of the dynamo in response to the charge variation of the battery. At present, an alternating current generator or "alternator" is the type dynamo commonly in use on engine powered vehicles, and conventional alternators include a stator having three windings connected to provide a three-phase AC output and a rotor with a field winding appropriately driven by the engine. Alternators of this type generally include a rectifying circuit adapted to transform the AC voltage to DC which is then used to power the vehicle electrical system and charge the vehicle battery.

It is known to provide auxiliary AC power by modifying the vehicle electrical system through the addition of a second or "piggyback" alternator often mounted adjacent the alternator of the vehicle electrical system and driven mechanically by belts from the vehicle engine in the same manner as the vehicle electrical system alternator. To produce AC power the AC output of the piggyback alternator is directly tapped prior to rectification. AC power sources of this type are often difficult and expensive to install due to the often crowded conditions of the vehicle engine compartment, and additionally, sources of this type are unsatisfactory in that the AC output voltage, as well as its frequency, may vary significantly with changes in engine speed, and are therefore not reliable for powering appliances requiring constant voltage or constant frequency power. So-called "overvoltage regulators" are sometimes used with AC power sources of this type to prevent high voltage surges which might damage the tools or the like being powered, but these devices are unable to prevent the output voltage from dropping off.

U.S. Pat. No. 3,174,048 to Snyder et al. discloses an automotive battery charging circuit of the general type described above wherein the AC output of the alternator is employed prior to rectification for limited purposes not requiring constant frequency voltage.

U.S. Pat. No. 3,469,072 to Carlson discloses a heater system for protecting a motor vehicle battery against low temperature which is powered by the stepped up AC output of the alternator. In Carlson, the alternator is never disconnected from the vehicle electrical system to provide an increased voltage source.

Zechin U.S. Pat. No. 3,469,073 discloses an auxiliary electrical heating system again powered by the stepped up three-phase AC output of the alternator. No means for regulating the output voltage or the frequency of this voltage is disclosed.

Additionally, power output accessory units are known which boost and transform the 14 volt DC output of the battery into AC voltage rather than boosting the DC alternator output voltage and then transforming this increased DC voltage to AC, as taught by the instant invention. The use of the 14 volt DC battery voltage requires the unit being built to handle high current loads in the neighborhood of 120 amps or more, thereby necessitating the use of large and relatively expensive components. Further, power units of this type which modify the low DC battery voltage are generally limited in output to approximately 700 watts, unless a special, very high amperage capacity vehicle alternator is employed therewith.

Further, reference is made to Schneider U.S. Pat. Nos. 3,456,119 and 3,471,706 which relate to DC power output accessory units wherein the engine dynamo is disconnected from the vehicle battery to increase the DC output voltage of the dynamo.

BRIEF SUMMARY OF THE INVENTION

In one form, the present invention includes a power output accessory unit adapted to substantially isolate the alternator of a vehicle electrical system from the rest of the electrical system, such that the alternator DC output which normally supplies power to the vehicle electrical system provides a substantially increased voltage. This substantially increased DC voltage is connected to the intermediate tap of the primary coil of an autotransformer having a pair of thyristors and an associated capacitor connected to its end taps. A constant frequency vibrator or a solid state oscillating circuit is employed to alternately fire the thyristors across the primary coil to produce a constant frequency AC voltage suitable for powering power tools or appliances having constant frequency AC voltage requirements.

While this invention is discussed herein primarily with respect to its use in conjunction with a vehicle electrical system, it will be understood that it may also be employed in conjunction with engines at fixed locations to provide a constant frequency and voltage power plant.

In another form of the invention a voltage regulator is provided to sense variations in the constant frequency AC voltage and control the field current of the alternator in response to these variations to provide a desired increased DC output voltage at the alternator output terminal, which in turn is modified to provide a constant AC voltage output at the outlet receptacle of the unit.

In still another embodiment the transformer is provided with a secondary winding which acts to step down the constant frequency AC voltage which is then rectified and voltage regulated to energize the alternator field responsive to variations in this low voltage DC current, thereby allowing the voltage regulator to be constructed of relatively inexpensive low voltage components. Further, the secondary coil of the transformer may be used to perform the additional function of simultaneously maintaining the charge of the vehicle battery.

It is thus an object of the present invention to provide a power output accessory unit adapted to deliver constant frequency AC voltage for operating portable power tools, appliances or the like under varying or various load power requirements.

Another object of the present invention is to provide a power output accessory unit for use on an engine powered land or water craft which is easy to install and relatively inexpensive to construct.

More particularly, it is an object of the present invention to provide a power output accessory unit able to deliver power at 120 volt AC, 60 hertz at various levels of load power consumption.

Still another object of this invention is to provide a power output accessory unit which makes use of the DC output voltage of an engine dynamo to produce AC power.

An additional object of the present invention is to provide an AC power output accessory unit for use in conjunction with the electrical system of a vehicle adapted to isolate the vehicle alternator from the vehicle electrical system to allow the DC output voltage of the alternator to increase.

Still another object of the present invention is to provide an AC power output accessory unit adapted to monitor its power output and control the alternator output voltage in response to variations therein.

One more object of the present invention is to provide a power output accessory unit able to produce a relatively high power output while handling relatively low currents.

An additional object of the present invention is to provide a power output accessory unit for use in conjunction with the electrical system of a vehicle adapted to simultaneously produce a constant frequency AC output and maintain the charge of the vehicle battery.

Other and additional objects and advantages will be apparent from the following description taken in conjunction with the accompany drawings.

BRIEF DESCRIPTION OF THE DRAWINGS

FIG. 4 is a schematic drawing of the electrical circuitry of a typical power output accessory unit made according to the instant invention.

FIG. 5 is a schematic drawing of the electrical circuitry of another embodiment of the instant invention.

FIG. 6 is a schematic drawing of a portion of the electrical circuitry of still another embodiment of the instant invention.

DETAILED DESCRIPTION OF THE INVENTION

Figure 1:
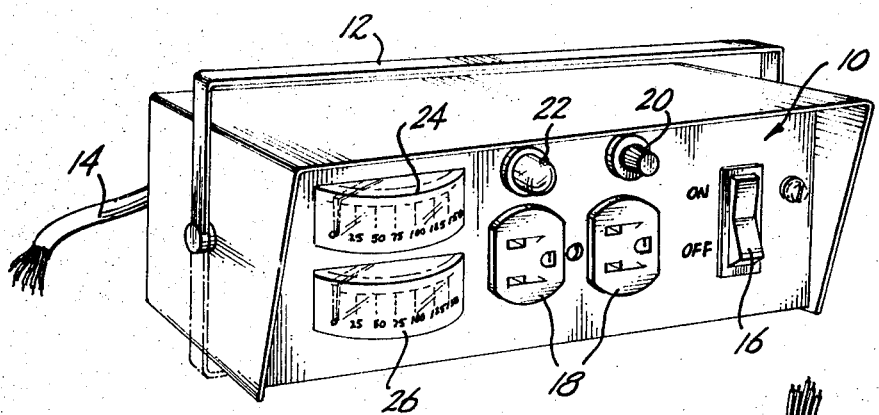
FIG. 1 is a front perspective view of a control panel and outlet receptacle mount of a typical power output accessory unit made according to the instant invention.
Figure 2:
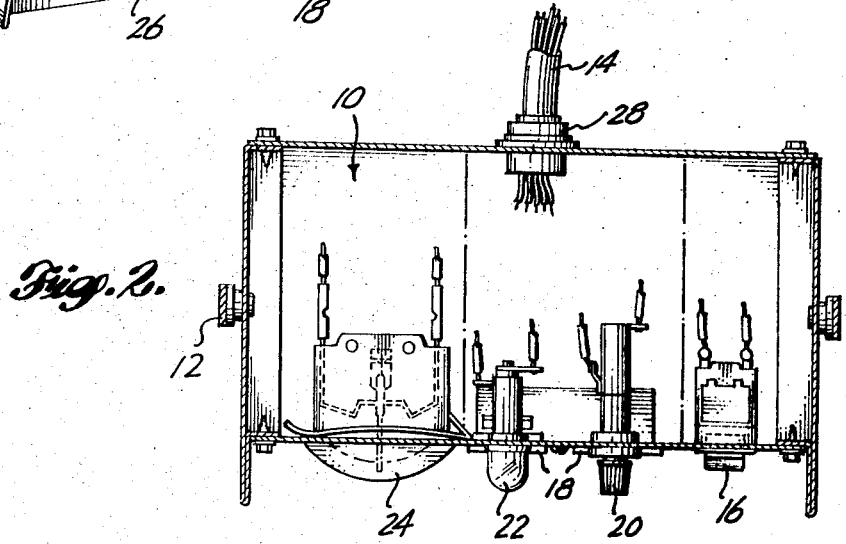
FIG. 2 is a top plan view of the control panel of FIG. 1 having the case broken away and with the various conductors fragmented to more clearly show the physical layout of the control panel components.

Referring initially to FIGS. 1 and 2, the control panel and casing 10 of a typical power output accessory unit is shown which is made according to the instant invention and adapted to be mounted on or beneath the dashboard of a vehicle by means of pivotal bracket 12. Typical dimensions for this control head would be 3 × 4.5 × 8 inches. Cable 14, a portion of which is shown, extends from the control panel and casing to a separate casing (not shown) containing the circuitry for the unit. The circuitry containing casing may be disposed in the trunk or other storage area of the vehicle so as not to clutter the passenger compartment, and the circuitry therein is, in turn, connected to the electrical system of the vehicle as will be explained more completely hereafter with reference to FIG. 4.

Control panel and casing 10 for a typical power output accessory unit may include a double pole double throw switch 16 having an on and off position which controls the operation of the power output accessory unit. Switch 16 may also include a momentary override position for a purpose which will also be described hereafter.

Control panel and casing 10 also mounts a pair of double conductor 110-120 volt AC output receptacles 18, which as shown in FIG. 2 may comprise a single subassembly.

The instant description of a specific embodiment of the present invention refers primarily to a power output accessory unit adapted to provide the common 110-120 volt output at 60 hertz commonly required by power tools, appliances and the like, from a 12-14 volt engine electrical system, but it should be understood that, with obvious modifications, this invention may be employed to produce different voltages and/or different design frequencies from engine electrical systems having like or different voltages. Additionally it should be understood that units having rated power outputs varying between 1,200 watts and 3,000 watts or higher, for example, may be constructed, by employing obvious variations in certain unit components.

Circuit breaker means such as fuse 20 in the output receptacle circuit, which in a 2,000 watt unit, for example, would be a 20 amp fuse, as well as indicator light 22, voltmeter 24 and ammeter 26 are also mounted on control panel and casing 10. Cable retainer 28 is provided at the rear of casing 10 to secure electrical conduit 14 extending to the circuitry containing casing disposed in the vehicle storage compartment or a similar location.

Figure 3:
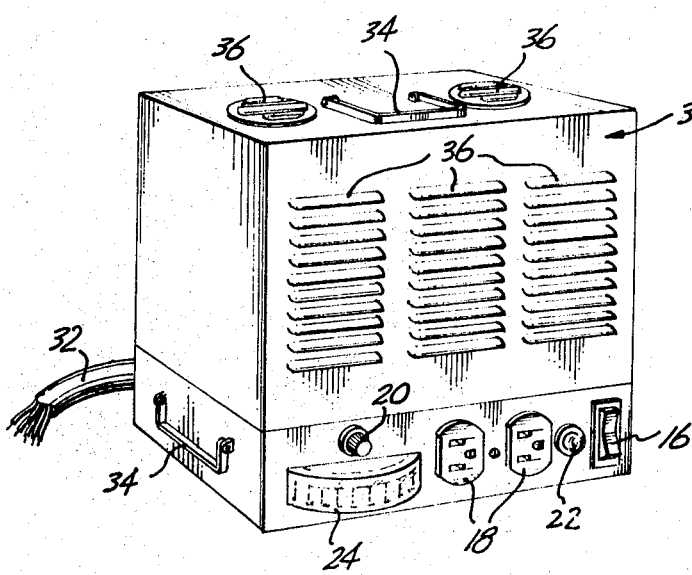
FIG. 3 is a front perspective view of another typical embodiment of a power output accessory unit made according to the present invention wherein the control panel, outlet receptacle mount and the circuitry containing case are combined in a single unit.

FIG. 3 discloses a modified embodiment of the instant invention wherein the control panel and circuitry containing casing are combined in a single unit 30. The typical dimensions of this unit would be approximately 7 × 9 × 12 inches, readily enabling placement of the unit in the vehicle storage compartment or in the vehicle passenger compartment at the option of the owner and depending in part upon the need for placing outlet receptacles 18 in any particular location. Outlet receptacles, of course, may be disposed at any desired location on the land or water vehicle and connected to outlet receptacles 18 by conventional electrical wiring extension means. The lower portion of unit 30 includes a control panel having a double pole double throw switch 16 having a momentary override position, an indicator light 22, circuit breaking fuse 20 and voltmeter 24. As a matter of choice, no ammeter is provided on unit 30, however it will be understood that one could be provided through obvious rearrangement of the control panel. Cable 32 may extend from unit 30 to the dynamo of the vehicle electrical system and to the vehicle battery as will be described more completely hereafter. Handles 34 are provided on unit 30 to facilitate carrying of the unit, while vents 36 aid in dissipating heat generated by the circuitry contained therein.

Referring now to FIG. 4, the circuitry and operation of one embodiment of the instant power output accessory unit will be described. As known, a conventional vehicle electrical system may include a 12 volt DC storage battery 38 having a grounded negative terminal 40 and an ungrounded positive terminal 42; an engine driven alternator 44 having a field winding terminal 46, an armature related DC output terminal 48 and ground 50; and a voltage regulator 52 connected to receive an input from the battery and additionally connected to the field winding terminal 46 of the alternator. As has been set forth above, conventional vehicle electrical system dynamos supply low voltage DC power to the vehicle electrical system and maintain the charge of battery 38. The conventional alternator is, however, an AC voltage generator with an internally connected rectifier circuit to transform the alternator generated AC voltage to the DC voltage required by the vehicle electrical system. On alternators such as those normally mounted on mass produced vehicles, only the low voltage DC terminals are exposed, and it will thus be understood that terminal 48 relates to the DC output of the alternator.

In normal vehicle operation, and with power output unit switch 16 in the off position, vehicle ignition switch 54 is closed to set up a charging circuit which runs from alternator output terminal 48 through conductor 56 to DC ammeter shunt 58, through connector 60 to deenergized contactor 62, and then through connector 64 to junction block 66 and back through connector 68 to the battery 38. With the ignition switch 54 closed the vehicle voltage regulator controls alternator field 46 through connector 70, switch 16 and connector 72 to regulate the battery and vehicle electrical system voltage.

Dashed line 84 is provided to visually separate the circuitry of the conventional engine electrical system above the line from the circuitry of the power output accessory unit below the line. Dashed square 82 is provided to indicate, in general, the circuitry of the voltage regulator of the power output accessory unit itself.

To activate the power output accessory unit to provide power at 110-120 volt AC, 60 hertz, for example, switch 16 is moved to the on position shown in dashed line in FIG. 4, thereby isolating the alternator field terminal from the control of the vehicle voltage regulator and energizing the unit. Switch 16 is a double pole double throw contactor, and includes a momentary override portion 86 which is momentarily held closed to energize contactor 62 through connector 80, fuse 78 and connector 76. The momentary portion 86 of switch 16 acts as a safety device to shut the unit down automatically should the vibrator fail to operate or should the 14 volt power supply be lost, thus preventing potential damage by excessively high alternator current in the power output accessory unit.

When contactor 62 is energized, it moves, as shown in dashed line, to interconnect connectors 88 and 90 and deliver the alternator output from terminal 48 to the center tap 92 of the primary coil 94 of autotransformer 96 through connector 98 and input fuse 100. In a 2,000 watt power unit, for example, it has been found that fuse 100 may satisfactorily have a 50 amp capacity.

It should be understood that as disclosed herein, the engine which drives dynamo 44 is considered to be set at a speed sufficient to produce the desired increased DC output at dynamo output terminal 48 when the dynamo is isolated from the vehicle electrical system. It is also contemplated that means may be provided to vary this engine speed in response to the electrical load on the unit. For example, a solid state control may be used in conjunction with the load responsive, engine speed control components disclosed in Schneider U.S. Pat. No. 3,456,119 for this purpose. In one arrangement, the solid state control is switched on simultaneously with the power output accessory unit by means of connector 104A, shown in dotted line. Dotted line connector 148A interconnects the solid state control and connector 148 to allow the control to respond to changes in the field voltage being supplied by voltage regulator 142. Since field voltage varies with the electrical load being applied at outlet receptacle 18, connector 148 provides a desirable reference to regulate this solid state control. However, other reference points, such as connectors 122, 124 or 140 could also be used.

Thus this control assembly senses alternator field voltage and responds to changes therein by varying engine speed to provide the necessary input into the power output accessory unit from alternator 44.

When double pole double throw switch 16 is moved to the on position the alternator is isolated from the vehicle electrical system and the DC output voltage increases to approximately 60 volts as opposed to the 14 volt DC output normally employed to power the vehicle electrical system. This increased approximately 60 volt DC output is fed to the center tap of transformer 96 where it is converted to 60 hertz, 120 volt AC.

Simultaneously with the energization of contactor 62, switch 16 moves to energize vibrator 102 through connector 104 and a ground through the coil of the vibrator. In one embodiment of the invention it has been found that a 60 cycle vibrator such as a Model No. 406513 manufactured by the Oak Manufacturing Company, Crystal Lake, Illinois, is satisfactory, although it is to be understood that other oscillatory means, including known solid state oscillating circuits, have equal utility for the purpose.

As disclosed in FIG. 4, the poles 106 and 108 alternately contacted by vibrating reed 110 are connected through resistors 112 and connectors 114 and 116 to thyristors, such as silicon controlled rectifiers (SCRs) 118 and 120 respectively. Resistors 112 are provided to produce a proper gate voltage and current for SCRs 118 and 120. SCR 118 is connected to one end tap of the primary coil 94 of transformer 96, SCR 120 is connected to the opposite end tap of the primary of the transformer, while capacitor 119 is connected therebetween. The SCR, capacitor and transformer configuration shown is a conventional so-called "McMurray-Bedford Inverter," although it will be understood that other similarly functioning circuit configurations may be substituted therefor. In the disclosed embodiment, as will be understood, vibrator 102 is tuned at 60 hertz and SCRs 118 and 120 alternately fire with the 60 volt DC alternator output oscillating across the primary of the transformer. The oscillation thus induced between the two end taps of the primary coil and across the approximately 60 volt DC input at center tap 92 produces a 120 volt AC voltage across connectors 122 and 124, with connector 122 leading to one side of AC receptacle 18 and with connector 124, fuse 20 and connector 128 leading to the opposite side of the AC receptacle.

More completely, assuming SCR 118 to be conducting and SCR 120 to be blocking, a condition caused by vibrating reed 110 contacting pole 106, current from the DC alternator output flows through conductor 98 through the left side of the transformer primary coil 94. Autotransformer action produces a voltage approximately twice the boosted 60 volt output of the alternator at the anode of SCR 120, which thus charges capacitor 119 to approximately 120 volts. When vibrating reed 110 contacts pole 108, SCR 120 is triggered causing the voltage at point 121 to rise, thereby reverse biasing SCR 118 and turning it off. Capacitor 119 maintains the reverse bias for the required turn off time. When SCR 118 is again triggered by vibrating reed 110, the inverter returns to the first state. Thus, the DC supply current flows alternately through each side of the transformer primary producing a 120 volt AC voltage which is tapped off to receptacle 18.

While a single receptacle 18 is illustrated in FIG. 5, it will be readily understood that a two receptacle subassembly such as that illustrated in FIGS. 1-3 may be readily substituted therefor. Voltmeter 24 is connected across AC outlet receptacle 18 to monitor the output voltage at the receptacle.

As known, thyristors such as SCRs 118 and 120 once fired remain in a conductive state until turned off, and thus the constant frequency AC output voltage generated by alternately firing these devices across the primary of transformer 96 is fundamentally of the square-wave type. If desired, circuitry can be designed employing transistors of the NPN type which may be substituted for SCRs 118 and 120 to produce a substantially sine wave voltage.

FIG. 5 schematically discloses a layout of the circuitry of one simple form of the instant invention wherein a manual control means such as potentiometer 130 is provided to allow the alternator field current to be adjusted in response to changes in the desired 120 volt AC output at outlet receptacle 18 as monitored by voltmeter 24. The alternator field current is adjusted to maintain the DC alternator output voltage in the range of 60 volts which is transmitted to the center tap 92 of autotransformer 96 through a connector 132 where power at 120 volt AC 60 hertz is produced therefrom in substantially the same manner disclosed above with reference to FIG. 4. Thus it will be understood that, in simple form, the output voltage of the alternator is maintained at a level substantially higher than the 12–14 volts DC normally needed to charge the associated battery and power an associated electrical system and further that this alternator output voltage is maintained by adjustments made in response to variations in the constant frequency AC output voltage supplied to outlet receptacle 18.

Referring again to FIG. 4, a secondary coil 134 is shown associated with transformer 96 to step down the increased voltage at the primary coil. Additionally, rectifiers 136 and 138 are provided to transform the AC voltage back to DC and thus it will be understood that in FIG. 4, connector 140 is at approximately 14 volts DC.

As has been set forth above, the circuitry within dashed square 82 comprises a voltage regulator 142 of the simple transistor type generally conventional per se, although diode 144 has been added to block the battery voltage so that the regulator senses the output of the secondary of the transformer 96, and diode 146 has been added to limit amperage drain when the switch 16 is in the off position. Low voltage DC line 140 from the secondary 134 of the transformer provides a reference for the voltage regulator 142 which in turn controls the alternator field current through connectors 148, switch 16 and connector 72. Connectors 72 and 148 are interconnected by switch 16 at the time of initial actuation of the switch 16 described heretofore. The alternator field, and consequently the alternator output, is thus automatically controlled by voltage regulator 142 to produce a substantially constant alternator output voltage sufficient to maintain a constant 120 volt AC voltage across the primary of transformer 96.

The stepping down and rectifying of the 120 volt AC transformer voltage allows voltage regulator 142 to be constructed of low voltage components at relatively low cost as compared to the components of a voltage regulator capable of directly sensing the 120 volt AC output voltage at outlet receptacle 18 and controlling the alternator field current in response to variations in this relatively high AC voltage. It is understood however, that a power output accessory unit employing a voltage regulator adapted to monitor the high voltage AC output of the transformer is also considered to be within the scope of the instant invention.

Secondary transformer coil 134 and rectifiers 136 and 138 perform an additional function in that the 14 volt DC voltage produced thereby may be used to maintain the charge in battery 38 through a circuit including connectors 140, 149, diode 144, connector 80, fuse 78, connector 76, connector 64, junction block 66 and connector 68 to battery 38. Ordinarily, a vehicle battery would tend to become depleted if isolated from the alternator output in the manner described above for any length of time during engine operation, but the feeding of the 14 volt DC output of the secondary coil of the transformer to the battery allows the instant power output accessory unit to be operated indefinitely without lowering the charge of the battery.

FIG. 6 shows a modified embodiment of autotransformer 96 which may be used in lower wattage power output accessory units and includes additional end windings 150 and 152 on primary coil 94. As may be understood, the provision of these additional end windings allows transformer 96 to produce the desired 120 volt AC power at outlet receptacle 18 from a lower DC alternator output voltage in line 132. While a principal feature of the present invention, as disclosed with reference to FIGS. 4 and 5, is the use of an increased DC alternator output voltage to produce the desired AC power while handling low amperage, under low power loads the engine which drives dynamo 44 in such circumstance runs at unnecessarily high r.p.m. levels. Engine fuel may be conserved through use of the autotransformer of FIG. 6 which, with the proper number of added end windings, may produce 120 volt AC power from a DC alternator output of 30 volts, for example. Thus while the alternator output voltage is still allowed to increase after isolation of the alternator from the engine associated electrical system, the boosted alternator output level is lower than that disclosed with reference to FIG. 4. The modification of FIG. 6 may be used successfully with power units having outputs in the neighborhood of 1,200 watts or less wherein the amperage increases due to the low alternator output voltage are relatively small and do not require the use of high amperage components, but this modification cannot be used to produce 2,000 to 3,000 watt or greater outputs, for example, without increasing component capacity.

It will also be understood that the arrangement of FIG. 6 may be used with an appropriate number of added end windings and a boosted dynamo output voltage, and in conjunction with a 240 volt outlet receptacle tapped from the outermost additional end windings to provide a power output unit having both a 120 and 240 volt output.

From the above it will be understood that a method is disclosed of producing constant frequency AC voltage at an outlet receptacle from an engine having an electrical system including a DC storage battery, an engine driven dynamo having a field winding terminal and an output terminal normally adapted to deliver low voltage DC power to the engine electrical system and a voltage regulator receiving a power input from the battery and having a field terminal connected to the field winding terminal of the dynamo. This method includes the steps of isolating the dynamo from the engine electrical system and allowing the DC output voltage of the dynamo to increase. In the disclosed embodiments of FIGS. 4 and 5, the dynamo output voltage is allowed to run up to approximately 60 volts DC which is then transformed to 120 volts AC, but it will be understood that the dynamo output voltage may be allowed to run up to either a higher or lower voltage to produce correspondingly higher or lower AC voltages at outlet receptacle 18.

Allowing the dynamo or alternator output voltage to increase allows the use of components in this power output accessory unit designed to handle relatively low currents, generally below 50 amps. The use of low amperage components produces a cost savings when compared to certain of the prior art units discussed above which take 14 volts DC off the vehicle battery, and thus, are required to handle currents in the range of 120 amps or better.

After isolating the dynamo from the vehicle electrical system and allowing the DC voltage output to increase, this output voltage is connected to the center tap of the primary coil of an autotransformer having a pair of thyristors and an associated capacitor connected to the end taps thereof. A constant frequency vibrator, operating at 60 hertz in the disclosed embodiment, is provided to alternately fire the thyristors across the primary of the autotransformer to produce 120 volt AC 60 hertz output power. Outlet receptacle 18 is connected to the primary to receive the jacks of tools and appliances having constant frequency AC power requirements. This AC output voltage, or in one form of the invention, a stepped down DC voltage, is monitored and the alternator field current is adjusted in response to variations in the unit output voltage to control the alternator or dynamo output voltage at a desired level to produce a constant voltage AC output.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A method of producing constant frequency AC voltage from an engine electrical system including a DC storage battery; an engine driven dynamo having a field winding terminal and an output terminal which normally delivers low voltage DC power to said electrical system; and a voltage regulator receiving a power input from said DC storage battery, and having a field terminal connected to the field winding terminal of said dynamo; said method including the following steps:
   a. isolating said dynamo from said electrical system and increasing the DC voltage at the output terminal of the dynamo;
   b. applying such increased voltage DC output to the primary coil of an autotransformer;
   c. oscillating said increased DC voltage across said primary coil at a substantially constant frequency to produce constant frequency AC voltage;
   d. monitoring said constant frequency AC voltage; and
   e. controlling the field of said dynamo in response to variations in the voltage level of said constant frequency AC voltage to maintain a substantially constant AC voltage level at said dynamo outlet terminal.

2. The method of claim 1 including the steps of:
   a. stepping down and rectifying a portion of said constant frequency AC voltage;
   b. monitoring said stepped down DC voltage; and
   c. controlling the field of said dynamo in response to variations in said stepped down DC voltage to maintain a desired increased voltage at said dynamo outlet terminal.

3. The method of claim 1 including the steps of:
   a. stepping down and rectifying a portion of said constant frequency AC voltage to produce a DC voltage having a value of approximately 14 volts; and
   b. maintaining the charge of said DC storage battery of said engine electrical system by applying said stepped down DC voltage thereto.

4. A power output unit adapted to produce constant frequency AC voltage for use with an engine of the type having an electrical system including a dynamo, a DC battery and a voltage regulator, including:
   switch means movable to isolate said dynamo from said electrical system and enabling the dynamo DC output voltage to increase;
   means for converting the increased DC output voltage from said dynamo to a constant frequency AC voltage;
   means sensing the level of said constant frequency AC voltage; and
   means for controlling said dynamo DC output voltage to maintain said DC output voltage at a relatively constant level.

5. The power output unit of claim 4 wherein said means for transforming a DC output voltage from said dynamo to a higher, constant frequency AC voltage includes autotransformer means, and means for oscillating said DC output voltage across the primary coil of said autotransformer means.

6. The power output unit of claim 5 wherein said means for oscillating said DC output voltage includes a pair of thyristors connected to the end taps of the autotransformer coil, capacitor means connected between said thyristors, and a constant frequency vibrating means adapted to alternately fire said thyristors.

7. The power output unit of claim 6 wherein said vibrating means includes a solid state oscillating circuit.

8. The power output unit of claim 4 wherein the means for controlling said dynamo DC output voltage is responsive to variations in the constant frequency AC voltage.

9. The power output unit of claim 8 comprising voltage regulator means responsive to variations in the AC voltage and providing a signal output connected to control the dynamo DC output voltage.

10. The power output unit of claim 4 including means for stepping down and rectifying said constant frequency AC voltage, means for monitoring said stepped down DC voltage; and means for controlling said dynamo DC output voltage responsive to variations in said stepped down DC voltage.

11. The power output unit of claim 10 wherein said means for stepping down and rectifying said constant frequency AC voltage includes an autotransformer having a secondary step down coil and rectifier means connected to said secondary coil and providing a DC output responsive to variations in the level of the constant frequency AC voltage.

12. A power output unit for use with an engine of the type having an electrical system including a DC storage battery; an engine driven dynamo having a field winding terminal an an output terminal which normally delivers low voltage DC power to said electrical system; and a voltage regulator receiving a power input from said DC storage battery, and having a field terminal connected to the field winding terminal of said dynamo; said power output accessory unit being designed to provide a power output for operating power tools, appliances or the like having a constant frequency AC voltage requirement, and comprising:
   switch means adapted to disconnect said dynamo from said engine electrical system and allow the DC voltage at the output terminal of said dynamo to increase;
   autotransformer means connected to the output of said dynamo;
   means oscillating said increased DC dynamo voltage across said autotransformer means and producing a constant frequency AC voltage;
   AC outlet receptacle means connected across said autotransformer coil;
   means monitoring the output voltage of said autotransformer; and
   means controlling the dynamo field current in response to variations in said autotransformer output to maintain a desired voltage level of constant frequency AC voltage at said outlet receptacle.

13. The power output unit of claim 12 wherein said means monitoring the output voltage of said autotransformer and said means controlling said dynamo field current include a voltage regulator.

14. The power output unit of claim 12 including a secondary winding on said autotransformer means adapted to step down the AC voltage, and rectifier means converting the stepped down output of said secondary winding to a DC voltage, and means applying said DC voltage as the input to said voltage regulator.

15. The power output unit of claim 14 comprising means applying an output of said voltage regulator to the field winding of said dynamo to maintain the constant frequency AC voltage at said outlet receptacle at a desired voltage level.

16. The power output unit of claim 12 wherein said switch means includes a momentary portion adapted to automatically disconnect said power output accessory unit from said engine electrical system in response to the failure of said unit and thereby prevent the application of high voltage and/or high amperage from the dynamo to said power output accessory unit.

17. A power output unit for use with an engine of the type having an electrical system including a DC storage battery; an engine driven dynamo having a field winding terminal and an output terminal which normally delivers low voltage DC power to said electrical system; and a voltage regulator receiving a power input from said DC storage battery, and having a field terminal connected to the field winding terminal of said dynamo; said power output accessory unit being designed to provide a power output for operating power tools, appliances or the like having a constant frequency AC voltage requirement, and comprising:
   switch means adapted to disconnect said dynamo from said vehicle electrical system;
   autotransformer means connected to the output of said dynamo;
   means oscillating said increased DC dynamo voltage across said autotransformer means and producing a constant frequency AC voltage;
   AC outlet receptacle means connected across said autotransformer coil;
   means monitoring the output voltage of said autotransformer; and
   means controlling the dynamo field current in response to variations in said autotransformer output to maintain a desired voltage level of constant frequency AC voltage at said outlet receptacle.

18. The power output unit of claim 17 wherein said means monitoring the output voltage of said autotransformer and said means controlling said dynamo field current include a voltage regulator.

19. The power output unit of claim 17 including a secondary winding on said autotransformer means adapted to step down the AC voltage, and rectifier means converting the stepped down output of said secondary winding to a DC voltage, and means applying said DC voltage as the input to said voltage regulator.

20. The power output unit of claim 19 comprising means applying an output of said voltage regulator to the field winding of said dynamo to maintain the constant frequency AC voltage at said outlet receptacle at a desired voltage level.

21. A power output unit for use with an engine powered vehicle of the type having an electrical system including a DC storage battery; an engine driven dynamo having a field winding terminal and an output terminal which normally delivers low voltage DC power to the vehicle electrical system; and a voltage regulator receiving a power input from said DC storage battery, and having a field terminal connected to the field winding terminal of said dynamo; said power output accessory unit being designed to provide a power output at the vehicle for operating power tools, appliances or the like having a constant frequency, constant voltage, power requirement, and comprising:

switch means adapted to disconnect said dynamo from said vehicle electrical system and allowing the voltage at the output terminal of said dynamo to increase;

autotransformer means including a primary coil connected to said dynamo output terminal;

fixed frequency oscillator means applying said increased DC dynamo voltage across said primary coil to produce a constant frequency AC voltage;

double conductor AC outlet receptacle means connected across said primary coil and adapted to receive power plugs from power tools, appliances or the like having a constant frequency AC voltage requirement;

secondary coil means associated with said autotransformer and adapted to step down the voltage across said primary coil;

rectifier means associated with the output of said secondary coil;

voltage regulation means connected between the rectified, secondary coil output and said dynamo field terminal and adapted to control said dynamo field current in response to variations in the secondary coil output.

22. The power output unit of claim 14 including connector means between said rectified transformer secondary coil output and said battery to maintain said vehicle battery in a charged condition.

* * * * *

UNITED STATES PATENT OFFICE
CERTIFICATE OF CORRECTION

Patent No. 3,655,991          Dated April 11, 1972

Inventor(s) FRANKLIN R. SCHNEIDER

It is certified that error appears in the above-identified patent and that said Letters Patent are hereby corrected as shown below:

Column 8, at line 60, change "AC" to -- DC --.

Signed and sealed this 27th day of November 1973.

(SEAL)
Attest:

EDWARD M. FLETCHER, JR.
Attesting Officer

RENE D. TEGTMEYER
Acting Commissioner of Patents